(12) United States Patent
Kulesza et al.

(10) Patent No.: US 10,216,770 B1
(45) Date of Patent: Feb. 26, 2019

(54) SCALING STATEFUL CLUSTERS WHILE MAINTAINING ACCESS

(71) Applicant: Amazon Technologies, Inc., Reno, NV (US)

(72) Inventors: Jakub Kulesza, Bellevue, WA (US); Srividhya Srinivasan, Seattle, WA (US); Deepak Agarwal, Redmond, WA (US); Anurag Windlass Gupta, Atherton, CA (US)

(73) Assignee: Amazon Technologies, Inc., Reno, NV (US)

( * ) Notice: Subject to any disclaimer, the term of this patent is extended or adjusted under 35 U.S.C. 154(b) by 678 days.

(21) Appl. No.: 14/530,480

(22) Filed: Oct. 31, 2014

(51) Int. Cl.
G06F 17/30 (2006.01)

(52) U.S. Cl.
CPC .. G06F 17/30289 (2013.01); G06F 17/30194 (2013.01)

(58) Field of Classification Search
CPC ..................... G06F 17/30289; G06F 17/30194
See application file for complete search history.

(56) References Cited

U.S. PATENT DOCUMENTS

| | | | | |
|---|---|---|---|---|
| 7,953,929 B1* | 5/2011 | Chatterjee | ............. | G06F 3/0607 707/999.204 |
| 8,260,840 B1* | 9/2012 | Sirota | ................... | G06F 9/5061 370/216 |
| 8,296,419 B1* | 10/2012 | Khanna | ................. | G06F 9/5072 709/201 |
| 8,370,597 B1* | 2/2013 | Chatterjee | ............. | G06F 3/0604 707/651 |
| 2005/0015546 A1* | 1/2005 | Zohar | ................... | G06F 3/0607 711/114 |
| 2009/0172139 A1* | 7/2009 | Wong | ..................... | G06F 9/5083 709/223 |
| 2010/0146122 A1* | 6/2010 | Prince, Jr. | ............. | G06F 9/5083 709/226 |

OTHER PUBLICATIONS

Christophe Taton, et al., "Self-Manageable Replicated Servers", Proceedings of the VLDB Workshop on Design, Implementation, and Deployment of Database Replication, Aug. 28, 2005, pp. 55-59.

* cited by examiner

*Primary Examiner* — Albert M Phillips, III
*Assistant Examiner* — Alp Onat
(74) *Attorney, Agent, or Firm* — Robert C. Kowert; Meyertons, Hood, Kivlin, Kowert & Goetzel, P.C.

(57) ABSTRACT

A stateful cluster may implement scaling of the stateful cluster while maintaining access to the state of the stateful cluster. A scaling event for a stateful cluster may be detected, and in response the stateful cluster may be adjusted to include a different number of nodes. The state of the cluster may then be logically distributed among the different number of nodes according to a monotone distribution scheme. The adjusted node may then service access requests according to the monotone distribution scheme. Prior to making the adjusted storage cluster available for servicing access requests, the nodes from the original cluster may still service access requests for state.

20 Claims, 8 Drawing Sheets

SCALING STATEFUL CLUSTERS WHILE MAINTAINING ACCESS

BACKGROUND

As the technological capacity for organizations to create, track, and retain information continues to grow, a variety of different technologies for managing and storing the rising tide of information have been developed. Distributed storage systems, for example, provide clients with many different specialized or customized configurations of hardware and software to manage stored information in a highly durable and available way. Stateful clusters, such as may be used to implement distributed storage systems, may therefore be implemented as part of many different solutions for maintaining and managing information. Over time, utilization of a stateful cluster may change. For instance, the amount of data, workload, or access patterns to data may change, leaving current configurations less suited to the current utilization of the stateful cluster. Thus, the stateful cluster may be resized or scaled in order to provide a more optimal solution.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Distributed systems provide flexible solutions for solving many different problems. Maintaining state, such as data for a database, a cache, an information store, or any other set of data for a system, program, application or client, in a distributed system may allow for diverse access or interaction with the state. Large data sets may, for instance, be divided into various segments of data so that work may be performed upon them in parallel, significantly reducing processing time. As the use of a stateful cluster changes, whether as a result of storing more or less data, performing different types of workloads, or changing network conditions or loads, the size or configuration of state among storage nodes may be rescaled to achieve a more optimal number of nodes. Consider the scenario where each additional node added to a stateful cluster further subdivides and parallelizes the work that may be performed on the state. Scaling the stateful cluster in such a scenario may decrease the amount of time to perform large or complex tasks upon the state.

Figure 1:
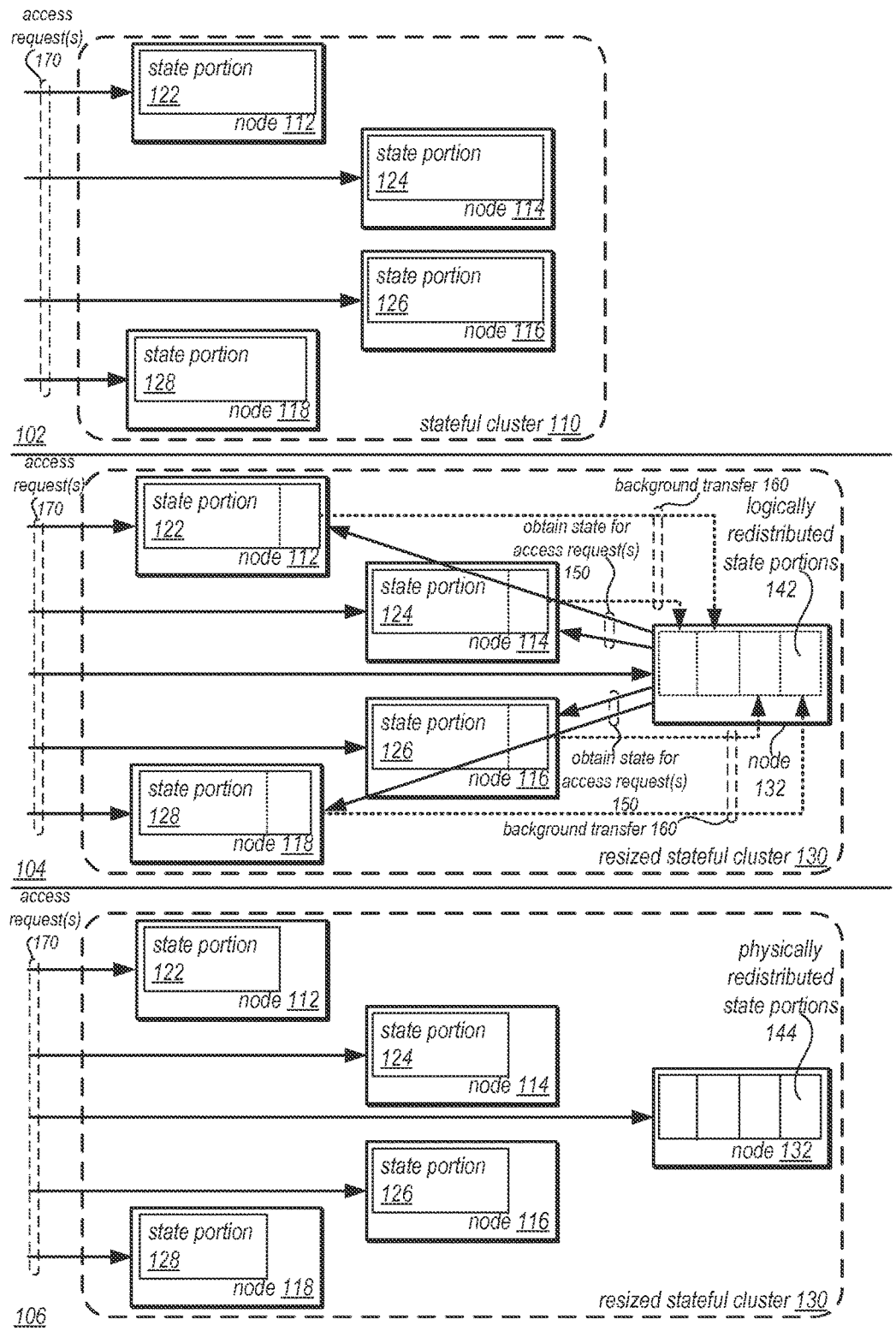
FIG. 1 is a series of block diagrams illustrating scaling of a stateful cluster of nodes while maintaining access to state in the stateful cluster, according to some embodiments.

Scaling a cluster that is actively interacting with clients or other users, however, may prove challenging. Many typical cluster scaling techniques either block some or all access to a stateful cluster being scaled (e.g., in order to redistribute data among the resized cluster) or may perform a costly copy of the cluster offline, consuming significant resources before allowing a client to switch and bring the new cluster online at the different size. As described herein, scaling clusters may be performed while maintaining access to the state in the stateful cluster, in various embodiments. FIG. 1 is a series of block diagrams illustrating scaling of a stateful cluster of nodes while maintaining access to state in the stateful cluster, according to some embodiments.

As illustrated in scene 102, stateful cluster 110 may include nodes 112, 114, 116, and 118, each of which may maintain respective portions of the state (122, 124, 126, and 128) that is maintained in stateful cluster 110. In this scenario, each of the different nodes 112, 114, 116, and 118 may process access requests 170 for the respective portion of state maintained at the node. Thus, node 112 may process an access request 170 with respect to state portion 122. For example, if an access request is for a particular data record, or set of data records, that match a particular query predicate, then node 112 may search state portion 122 to identify those data records in state portion 122 that match the query predicate. Access request(s) 170 may generally interact with the state maintained in the stateful cluster 110, whether to read, write, change or modify the state.

While stateful cluster 110 may provide adequate performance for a certain load of access requests 170 or a certain amount of state information, a change in access request(s) 170 or the amount of stored state may be better served by a different number of nodes in the cluster. Thus, in various embodiments a scaling event for the cluster may be detected to adjust the number of nodes in the stateful cluster, as illustrated in scene 104. In this scenario an additional storage node 132 may be added to the resized stateful cluster 130, in response to the scaling event. A control plane, operator, or other entity or service may generally adjust the stateful cluster, such as by provisioning node 132. However, please note that a stateful cluster may be adjusted to increase or decrease the number of nodes in a resized stateful cluster 130, and thus FIG. 1 is provided as an example, and not intended to be limiting.

Once the node 132 is available, the state (portions 122, 124, 126, and 128) may be distributed according to a monotone distribution scheme among the resized stateful cluster 130 nodes. Thus, as illustrated in scene 102, different portions from each of the state portions are logically redistributed 142 to node 132. Logically distributing the state to node 132 may allow node 132 (and the other nodes 112, 114, 116, and 118) to be responsible for processing access requests 170 for those portions of the state now logically attributed to node 132. For example, an access request for the portion of state denoted by the dotted line from state portion 128 may be processed by node 132 (e.g., searched in response to a query). Therefore, as described below with regard to FIGS. 4A and 7, node 132 may directly access the portion (which may still be physically located at node 118) in order to obtain 150 the portion of state and service the access request 170. In this way, the workload for the different nodes may in resized stateful cluster 130 may be individually lowered, decreasing processing time for servicing an access request 170. For instance, CPU-bound workloads may take advantage of the additional processing capacity offered by the additional nodes, as processing the access request may not spend much time waiting on I/O operations to the storage maintaining the portion of state that is being processed.

Scaling a cluster in this way may allow access requests 170 to continue. Prior to the resized cluster 130, the original nodes may process access requests, upon logically redistribution of the data 142 (which may be simply applying a new distribution function to locate the node to perform the work), the resized stateful cluster 130 may continue processing access requests, without blocking reads, or writes to the state maintained in the stateful cluster. In some embodiments, the resize of the stateful cluster may be temporary and performed for a period of time before another scaling event is triggered to resize the cluster back to the original number of nodes. In some embodiments, however, the resized stateful cluster 130 may be a more long-term configuration. Thus, as illustrated in scene 104, a background transfer 160 may be performed to physically redistribute the data to node 132. Then, as illustrated in scene 106, node 132 may process access request(s) 170 for state by accessing local storage maintaining the physically redistributed state portions 144. As the distribution scheme may be monotone, the amount of state moving from each node may be minimized, increasing the efficiency (and reducing the complexity) of performing a background transfer 160. Once the background transfer is complete, in some embodiments, storage space at the originating nodes may be reclaimed.

Please note that the figures discussed with regard to FIG. 1 are provided as a logical illustration of a stateful cluster, nodes, access request(s), transfer(s) and redistributions, and thus are not intended to be limiting. As noted earlier the number of storage nodes may be different, as may be the type of monotone distribution scheme (e.g., increase or decrease the number of nodes by powers of 2).

This specification begins with a general description of scaling stateful clusters while maintaining access for data warehouse clusters for distributed database systems. Then, various examples of a distributed data warehouse service are discussed, including different components/modules, or arrangements of components/module, that may be employed as part of implementing a distributed data warehouse service configured to implement scaling stateful clusters while maintaining access for data. A number of different methods and techniques to implement scaling stateful clusters while maintaining access for state are then discussed, some of which are illustrated in accompanying flowcharts. Finally, a description of an example computing system upon which the various components, modules, systems, devices, and/or nodes may be implemented is provided. Various examples are provided throughout the specification.

A stateful cluster may be implemented as part of a distributed storage system, such as a distributed database system may, in some embodiments. The distributed database system may itself be implemented as a network-based service that makes it quick, easy, and cost-effective for clients (e.g., subscribers) to set up, operate, and scale a data warehouse in a cloud computing environment. The network-based service may manage time-consuming administration tasks, allowing subscribers to focus on their own applications and businesses. In some embodiments, the data warehouse system may be an enterprise-class database query and management system that is highly scalable and extensible. It may provide fast querying capabilities over structured data, may provide integration with various data loading and ETL (extract, transform, and load) tools, may provide client connections with best-in-class business intelligence (BI) reporting, data mining, and analytics tools, and may be optimized for very fast execution of complex analytic queries such as those including multi-table joins, sub-queries, and aggregation. In some embodiments, queries may be distributed and parallelized across multiple physical resources, and the data warehouse system may be scaled up or down on an as needed or dynamic basis while maintaining access to data maintained in the data warehouse system during the scaling operation. In some embodiments, subscribers may only pay for the resources they use. The data warehouse system may work effectively with database schemas of various types and/or organizations, in different embodiments.

In some embodiments, the distributed data warehouse systems described herein may derive much of their performance and fast computing power from the use of massively-parallel processing (MPP) and the clustering of compute nodes that carry out the execution of compiled queries using a divide-and-conquer strategy. Thus, scaling or resizing a cluster of compute nodes to fit the performance requirements or utilization of the data warehouse system for a particular client may allow for a more cost effective and performant data warehouse service. Moreover, maintaining both read and write access to the data while scaling the cluster of compute nodes may allow for scaling to be performed more dynamically, responding faster to changing needs of the data warehouse service and/or client. In some embodiments, a cluster may include one or more nodes, each including one or more disks, solid state devices, or other persistent storage devices on which data blocks are stored on behalf of clients. In some embodiments, clients/subscribers may submit queries in a number of ways, e.g., interactively via an SQL interface to the data warehouse system. In other embodiments, external applications and programs may submit queries using Open Database Connectivity (ODBC) and/or Java Database Connectivity (JDBC) driver interfaces to the data warehouse system.

In typical large database systems, the time it takes to restore data from a backup may represent a significant cost to the system. For example, in many existing systems, the entire data set needs to be restored before the database system can be restarted following a failure in the system. In some embodiments, the data warehouse systems described herein may be configured to back up data (e.g., the data making up various database tables) to a remote key-value storage system incrementally (e.g., one physical data block at a time), and to store, as part of each incremental backup operation, a list of the all of the data blocks in the system, whether they were backed up as part of that incremental backup or as part of a previous incremental backup operation. In some embodiments, the remote key-value storage system may be dedicated for backup storage, while in other embodiments the remote key-value storage system may provide general-purpose storage for a variety of clients and/or client applications. In various embodiments, a data warehouse system, a general-purpose computing system, or a computing system that provides another type of service that stores data locally in-memory (e.g., ephemerally) may write one or more copies of the data to a remote key-value storage system that employs disk, solid-state storage devices, or another type of persistent storage media in order to provide durability. As described in more detail below, the data warehouse systems described herein may be able to restart a cluster that stores data on behalf of a storage system subscriber (e.g., in a database) following a failure (i.e., allowing it to accept and service queries) without waiting for the entire data set to be restored from backup. Instead, a backup copy of any lost or corrupted data block may be streamed into the memory of the data warehouse system from the backup system by directly addressing it in the remote system using a unique identifier of the data block as a key.

Note that in the descriptions herein, the terms "data block" and "physical data block" may be used to refer to a portion (or block) of data that is stored as an individual (or separable) object in a distributed data warehouse system and/or in a remote key-value durable backup storage system on behalf of clients (e.g., users, client applications, and/or data warehouse service subscribers), or may be used to refer to that portion (or block) of the data as it is stored on a physical disk in a distributed data warehouse system, in system memory on a node in a distributed warehouse system (e.g., in systems that implement in-memory databases) and/or in a remote key-value durable backup storage system, depending on the context in which these terms appear. In some embodiments, data may be stored in data blocks having the same size as a standard unit of the data stored in the memory architecture for the system, which may correspond to a "page" in the memory. In other embodiments, the data blocks may be of a different size than the page size of the memory.

In some embodiments, the distributed data warehouse systems described herein may store two or more copies of each data block locally in the system (e.g., across a cluster architecture). For example, in one embodiment, a primary copy of each 1 MB physical data block may be stored on one disk of a node in a cluster, and one or more secondary copies (replicas) of that physical data block may be stored on other disks of other nodes in the same cluster. However, rather than replicating (or mirroring) an entire disk on one other disk, the copies of some of the data blocks stored on a given disk may be distributed on different disks than the copies of other data blocks stored on the given disk. The distributed data warehouse system may also store a copy of each data block as a separate object (i.e., value) in a remote backup storage system that provides durable key-value storage, and may store the keys for each data block within a list of data blocks in the system. For example, a superblock data structure that lists all of the data blocks stored in the data warehouse system (or in a node thereof) may include multiple entries, each of which stores metadata about an individual data block, and the metadata for each block may include a unique identifier (ID) that serves as a key to access a copy of the data block stored in the remote backup storage system. In some embodiments, the distributed data warehouse system may provide very high durability storage to its clients/subscribers by storing two copies of each data block in a given cluster (e.g., a primary copy and a secondary copy) and storing a third copy in a remote key-value durable storage system.

In some embodiments, the distributed data warehouse systems described herein may employ columnar (i.e., column-oriented) storage for database tables. In other words, column information from database tables may be stored into data blocks on disk, rather than storing entire rows of columns in each data block (as in traditional database schemes). In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. For a given number of disk requests, the column field values for many more rows may be retrieved than would be retrieved if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory.

In various embodiments, the distributed data warehouse systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, each cluster of the distributed data warehouse systems described herein may include a leader node and multiple computing nodes (i.e. non-leader nodes, such as query engines), each of which is virtual machine having some amount of storage (e.g., multiple disks) and/or processing power. In some embodiments, once it is configured, a cluster may be directly visible by (and accessible to) a client/subscriber through a network address. In other words, a client/subscriber may connect directly to a cluster (e.g., to submit queries and receive responses to those queries) and may not have to go through a web server (or service) to access the cluster except to set up and manage the configuration of the cluster. In some embodiments, the leader node in each cluster (which may not store client/subscriber data) may maintain query plans (e.g., including schema information and/or metadata) for performing various types of queries on the data stored by the computing nodes in the cluster. Within the leader node, a scheduler process may send query tasks (e.g., via a private network communication fabric) to the compute nodes for execution. In some embodiments, the leader node may also be responsible for partitioning incoming data (i.e., data included in write requests) for storage on various nodes of the cluster. For example, the leader node may determine the nodes on which primary copies of different portions of the received data will be stored. For instance, the leader node may distribute (either logically or physically) the location of data according to a monotone distribution scheme, such as a monotone hash function, in at least some embodiments.

In some embodiments, when a client request to perform a query (e.g., a read request or a write request) or some other type of database operation is received (e.g., by the leader node in a cluster), the distributed data warehouse system may spawn a new process to maintain session information for the client, and that process may be maintained as long as the client session remains open and that client is sending query requests to the leader node. The requested operation (a SQL query or some other database operation) may be routed through a parser and optimizer to develop a query execution plan to perform or execute the specified query or database operation (i.e., the logical steps needed to perform the query). The query plan may then be routed to the execution engine, which generates and compiles query execution code that the leader node and the non-leader nodes (sometimes referred to herein as the compute nodes) will execute to complete the query. In some embodiments, each of the individual execution plan steps may be involve a simple operation or manipulation of data, to be performed by the compute nodes or the leader node, and the communication network connecting the leader node and compute nodes may be used to distribute intermediate results. In some embodiments, the distributed data warehouse system may achieve excellent query execution performance by separating query processes in each of multiple node slices in order to execute the compiled query code in parallel. Therefore, the effect of a scaling operation on a data warehouse cluster may effectively increase the query processing capacity for a client according to the number of additional query processes operating. In addition, the distributed data warehouse system may take advantage of optimized network communication, memory and disk management to pass intermediate results from one query plan step to the next, which may also help to speed query execution. In some embodiments, the last segment of a query may return the requested data. If the return set is to be aggregated or sorted, the compute nodes may each send a respective portion of the intermediate result to the leader node, which may then merge the returned data so that the final result of the query can be sent back to the requesting client/subscriber.

Figure 2:
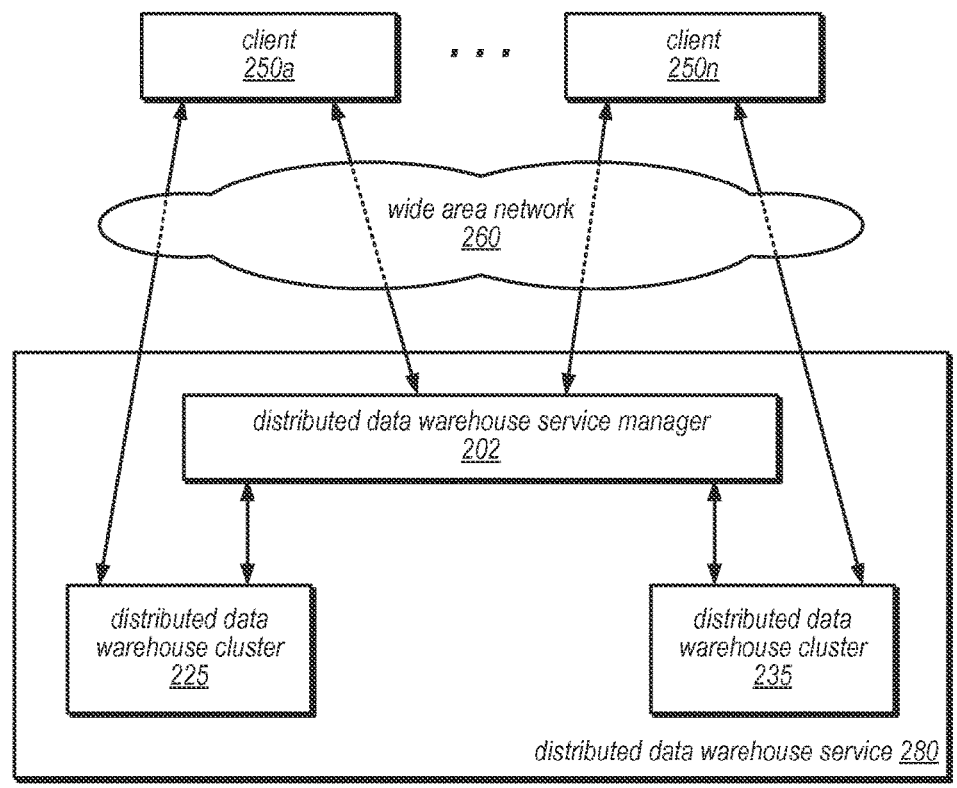
FIG. 2 is a block diagram illustrating various components of a distributed data warehouse service from the perspective of its clients, according to some embodiments.

FIG. 2 is a block diagram illustrating various components of a distributed data warehouse service from the perspective of its clients, according to some embodiments. Multiple users or clients may access a distributed data warehouse cluster to obtain data warehouse services. Clients which may include users, client applications, and/or data warehouse service subscribers), according to some embodiments. In this example, each of the clients 250a through 250n is able to access distributed data warehouse cluster 225 and 235 respectively in the distributed data warehouse service 280. Distributed data warehouse cluster 225 and 235 may include two or more nodes on which data may be stored on behalf of the clients 250a through 250n who have access to those clusters.

A client, such as clients 250a through 250n, may communicate with a data warehouse cluster 225 or 235 via a desktop computer, laptop computer, tablet computer, personal digital assistant, mobile device, server, or any other computing system or other device, such as computer system 1000 described below with regard to FIG. 8, configured to send requests to the distributed data warehouse clusters 225 and 235, and/or receive responses from the distributed data warehouse clusters 225 and 235. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data warehouse service manager 202.

Clients 250a through 250n may communicate with distributed data warehouse clusters 225 and 235, hosted by distributed data warehouse service 280 using a variety of different communication methods, such as over Wide Area Network (WAN) 260 (e.g., the Internet). Private networks, intranets, and other forms of communication networks may also facilitate communication between clients and distributed data warehouse clusters. A client may assemble a message including a request and convey the message to a network endpoint (e.g., a Uniform Resource Locator (URL)) corresponding to the data warehouse cluster). For example, a client 250a may communicate via a desktop computer running a local software application, such as a web-client, that is configured to send hypertext transfer protocol (HTTP) requests to distributed data warehouse cluster 225 over WAN 260. Responses or other data sent to clients may be formatted in similar ways.

In at least some embodiments, a distributed data warehouse service, as indicated at 280, may host distributed data warehouse clusters, such as clusters 225 and 235. The distributed data warehouse service 280 may provide network endpoints to the clients 250a to 250n of the clusters which allow the clients 250a through 250n to send requests and other messages directly to a particular cluster. As noted above, network endpoints, for example may be a particular network address, such as a URL, which points to a particular cluster. For example, client 250a may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Distributed data warehouse clusters, such as data warehouse cluster 225 and 235, may be made up of one or more nodes. These clusters may include different numbers of nodes. A node may be a server, desktop computer, laptop, or, more generally any other computing device, such as those described below with regard to computer system 1000 in FIG. 8. In some embodiments, the number of nodes in a data warehouse cluster may be modified, such as by a cluster scaling request. Nodes of a data warehouse cluster may implement one or more data slices for storing data. These data slices may be part of storage devices, such as the disk storage devices discussed below with regard to FIG. 3. Clusters may be configured to receive requests and other communications over WAN 260 from clients, such as clients 250a through 250n. A cluster may be configured to receive requests from multiple clients via the network endpoint of the cluster.

In some embodiments, distributed data warehouse service 280 may be implemented as part of a network-based service that allows users to set up, operate, and scale a data warehouse in a networked environment (e.g., cloud computing environment). The data warehouse clusters hosted by the network-based service may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently.

In various embodiments, distributed data warehouse service 280 may provide clients (e.g., subscribers to the data warehouse service provided by the distributed data warehouse system) with data storage and management resources that may be created, configured, managed, scaled, and terminated in response to requests from the storage client. For example, in some embodiments, distributed data warehouse service 280 may provide clients of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 280 may be implemented by a large collection of computing devices, such as customized or off-the-shelf computing systems, servers, or any other combination of computing systems or devices, such as the various types of devices described below with regard to FIG. 8. Different subsets of these computing devices may be controlled by distributed data warehouse service manager 202. Distributed data warehouse service manager 202, for example, may provide a cluster control interface, such as a network-based interface, to clients, such as clients 250a through 250n, or any other clients or users who wish to interact with the data warehouse clusters managed by the distributed data warehouse manager 202, which in this example illustration would be distributed data warehouse clusters 225 and 235. For example, distributed data warehouse service manager 202 may generate one or more graphical user interfaces (GUIs) for storage clients, which may then be utilized to select various control functions offered by the control interface for the distributed data warehouse clusters hosted in the distributed data warehouse service 280 via WAN 260. A cluster scaling request, or other cluster scaling event information (e.g., performance/utilization threshold for triggering a scaling request) may be selected, input and/or communicated via the network-based interface of distributed data warehouse service manager 202.

In at least some embodiments, distributed data warehouse service manager 202 may act as a control plane for data warehouse service 280, such as discussed below with regard to FIG. 4A, may provision, configure, and otherwise manage resources such as additional compute nodes, warehouse clusters, or other resources for data warehouse service 280.

Figure 3:
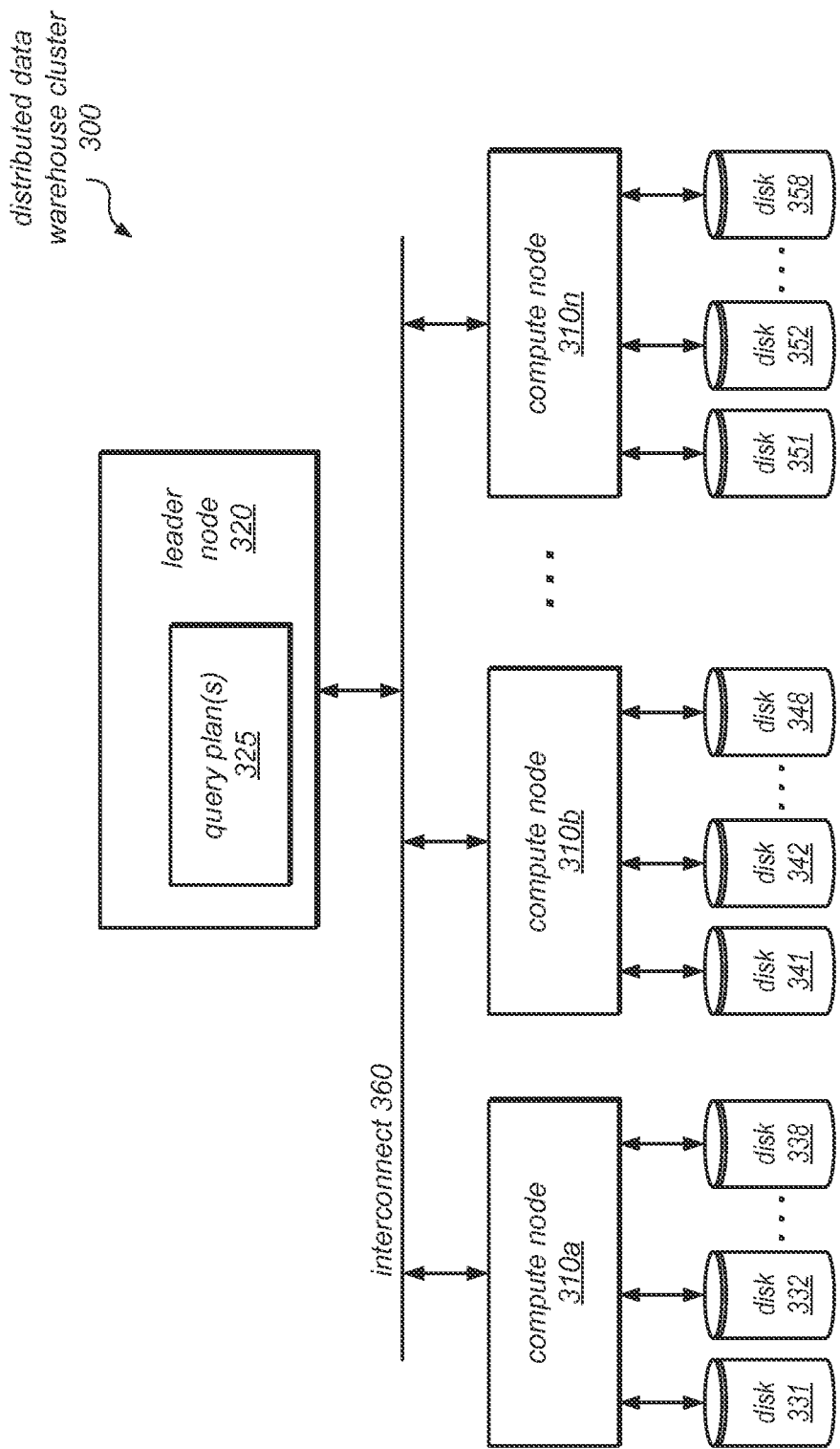
FIG. 3 is a block diagram illustrating a data warehouse cluster that implements scaling while maintaining access to data maintained in the data warehouse cluster, according to some embodiments.

FIG. 3 is a block diagram illustrating a distributed data warehouse cluster in a distributed data warehouse service, according to one embodiment. As illustrated in this example, a distributed data warehouse cluster 300 may include a leader node 320 and compute nodes 310a, 310b through 310n, which may communicate with each other over an interconnect 360. Leader node 320 may generate and/or maintain one or more query plans 325 for executing queries on distributed data warehouse cluster 300. As described herein, each node in a distributed data warehouse cluster may include multiple disks on which data blocks may be stored on behalf of clients (e.g., users, client applications, and/or distributed data warehouse service subscribers). In this example, compute node 310a includes disks 331-338, compute node 310b includes disks 341-348 through compute node 310n includes disks 351-358. In some embodiments, a component of the distributed data warehouse cluster (or the distributed data warehouse system of which it is a component) may support load balancing, using any of a variety of applicable load balancing techniques. For example, in some embodiments, leader node 320 may include a load balancing component (not shown).

In at least some embodiments, distributed data warehouse cluster 300 may be implemented as part of the network-based data warehousing service, such as the one described above, and includes a leader node 320 and multiple compute nodes, such as compute nodes 310a, 310b, and 310n. The leader node 320 may manage communications with storage clients, such as clients 250a through 250n discussed above with regard to FIG. 2. For example, a leader node may be a server that receives requests from various client programs (e.g., applications) and/or subscribers (users), then parses them and develops an execution plan (e.g., query plan(s) 325) to carry out the associated database operation(s). More specifically, the leader node may develop the series of steps necessary to obtain results for complex queries and joins. Leader node 320 may also manage the communications among compute nodes 310a through 310n instructed to carry out database operations for data stored in the distributed data warehousing cluster 300. For example, compiled code may be distributed by leader node 320 to various ones of the compute nodes 310a to 310n to carry out the steps needed to perform queries, and intermediate results of those queries may be sent back to the leader node 320. Leader node 320 may receive data and query responses or results from compute nodes 310a, 310b, and 310n. A database schema and/or other metadata information for the data stored among the compute nodes, such as the data tables stored in the cluster, may be managed and stored by leader node 320. For example, in various embodiments leader node 320 may maintain the distribution schema by which the data is store, such as the monotone distribution scheme. Leader node 320 may also direct the logical and/or physical distribution of data maintained in cluster 300 according to a monotone distribution scheme, in some embodiments.

Distributed data warehousing cluster 300 may also include compute nodes, such as compute nodes 310a, 310b, and 310n. These one or more compute nodes, may for example, be implemented on servers or other computing devices, such as those described below with regard to computer system 1000 in FIG. 8, and each may include individual query processing "slices" defined, for example, for each core of a server's multi-core processor. Compute nodes may perform processing of database operations, such as queries, based on instructions sent to compute nodes 310a, 310b, and 310n from leader node 320. The instructions may, for example, be compiled code from execution plan segments and steps that are executable by the particular data compute node to which it is sent. Data compute nodes may send intermediate results from queries back to leader node 320 for final aggregation. Each data compute node may be configured to access a certain memory and disk space in order to process a portion of the workload for a query (or other database operation) that is sent to one or more of the compute nodes 310a, 310b or 310n. Thus, compute node 310a, for example, may access disk 431, 432, up until disk 438. In various embodiments, compute nodes may be configured to perform the techniques described below with regard to FIG. 8, to process queries after scaling events for cluster 300 have occurred. Thus compute nodes 310 may communicate with other compute nodes 310 via interconnection 360 to obtain or transfer portions of data as part of scaling cluster 300.

Disks, such as the disks 331 through 358 illustrated in FIG. 3, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a distributed data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or probabilistic data structures that indicate data values not stored in a data block may all be stored in the respective entry for a data block. In some embodiments, the unique ID may be generated (and a corresponding entry in the superblock created) by the leader node or by a computing node when the data block is first written in the distributed data warehouse system.

Figure 4A:
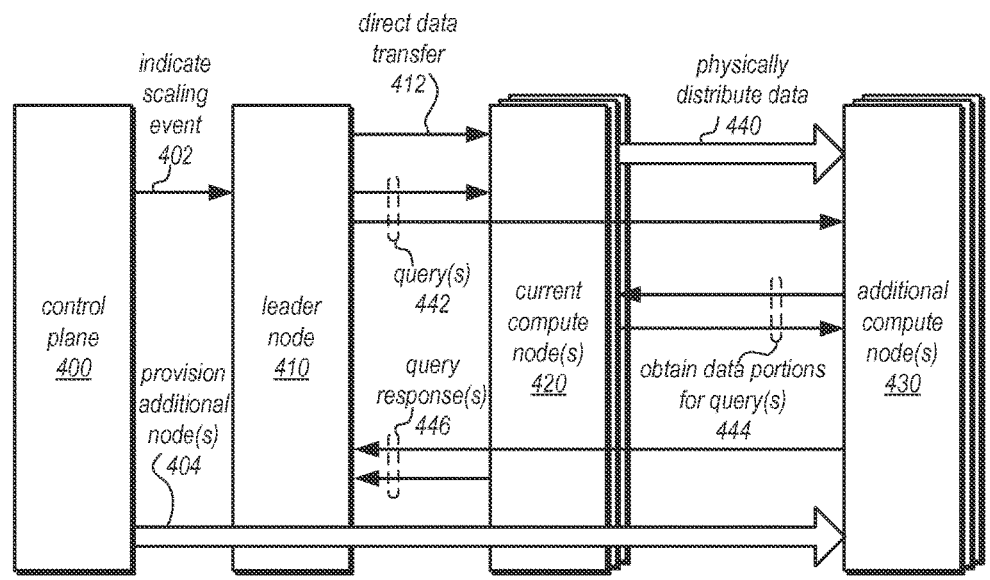
FIGS. 4A and 4B are block diagrams illustrating interactions among different components of a distributed data warehouse service that implements scaling of data warehouse clusters while maintaining access to data, according to some embodiments.
Figure 4B:
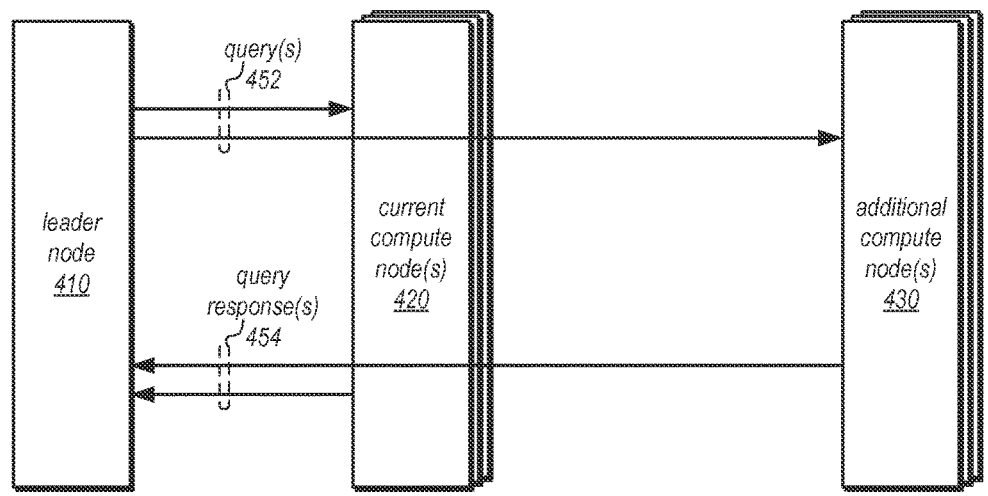

FIGS. 4A and 4B are block diagrams illustrating interactions among different components of a distributed data warehouse service that implements scaling of data warehouse clusters while maintaining access to data, according to some embodiments. In FIG. 4A, a control plane 400 (which may be data warehouse service manager 202 in FIG. 2) may detect a scaling event for a data warehouse cluster that includes leader node 410 and current compute node(s) 420. The scaling event may be triggered, in some embodiments, by monitoring the activity at the warehouse cluster, such as monitoring the workload of particular compute node(s) 420 and/or the leader node 410, the amount of data stored in the cluster, and the amount of network traffic to the cluster. A scaling request may also be submitted by a client, such as client 250 in FIG. 2, to control plane 400 (or to leader node 410) via network-based interface. In some embodiments, leader node 410 may detect the scaling event and indicate the event to control plane 400 (not illustrated). However, in various embodiments control plane 400 may indicate 402 a scaling event for the cluster to leader node 410. Control plane may also, in some embodiments, provision 404 the additional compute nodes 430 (if increasing the number of nodes), as well as providing their respective information to leader node 410 (such that communications between leader node 410 and additional compute node(s) 430 may be established.

Leader node 410 may also be receiving queries for select data from a client, such as client 250 in FIG. 2, for select data. As described above leader node 410 may send various instructions and requests to service the query(s) 442 to current compute node(s) 420 and additional compute node(s) 430 according to the monotone distribution scheme applied to logical distribute the data among the adjusted cluster including additional compute node(s) 430. In FIG. 4A, additional compute node(s) 430 may not have local access to the respective portions of data service by the compute node(s) 430, and thus may obtain data portion for query(s) 444 by communicating with current compute node(s) 420 which may be configured to share/provide the data to additional compute nodes(s) 430. Current compute nodes(s) 420 and additional compute node(s) 430 may send query response(s) 446 to leader node 410 based on the obtained data 444. Meanwhile, in some embodiments, leader node 410 may also direct the data transfer 412 of portions of data stored locally at current compute node(s) 420 to additional compute node(s) 430 in order to physically distribute the data 440 according to the monotone distribution scheme.

FIG. 4B illustrates interactions amongst the nodes of an adjusted warehouse cluster after the data has been physically distributed according to the monotone distribution scheme. Query(s) 452 may be directed to current compute node(s) 420 and additional compute node(s) 430. The nodes 420 and 430 may access local storage to process the query(s) and send query response(s) 454 back to leader node 410.

Figure 5:
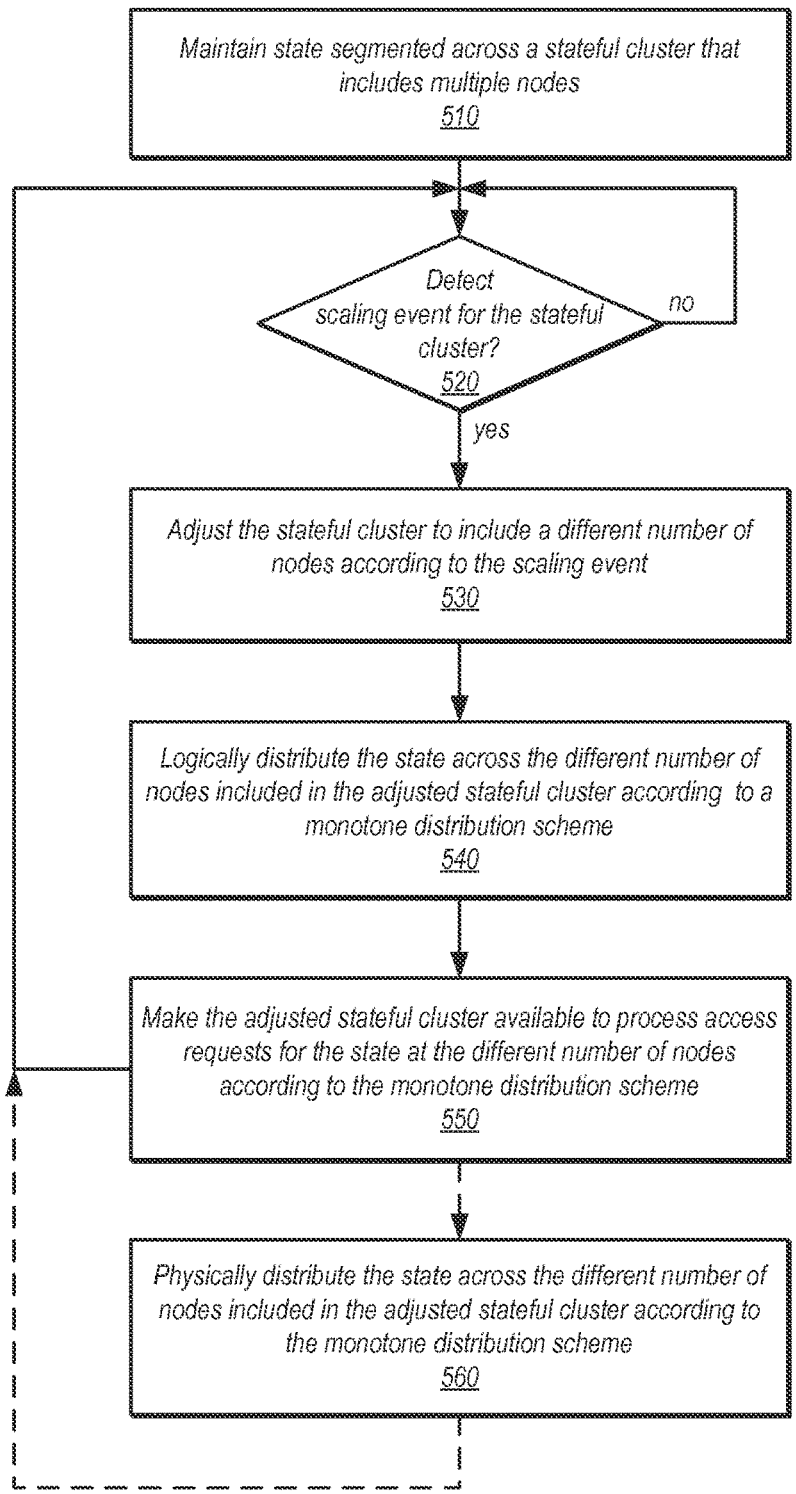
FIG. 5 is a high-level flowchart illustrating various methods and techniques for scaling stateful clusters while maintaining access to state in the stateful cluster, according to some embodiments.

Many different types of distributed systems that utilized stateful clusters may implement scaling stateful clusters while maintaining access. FIGS. 2-4B, discussed above, provide an example of a distribute data warehouse service implementing warehouse clusters for which scaling may be performed while maintain access to data. Other distributed storage systems, or other distributed systems generally that maintain state segmented across the nodes of a stateful cluster may implement scaling while maintaining access. FIG. 5 is a high-level flowchart illustrating various methods and techniques for scaling stateful clusters while maintaining access to state in the stateful cluster, according to some embodiments.

As indicated at 510, state may be segmented across a stateful cluster that includes multiple nodes. A stateful cluster may be a set of data or other information that may be accessed by a client, system, program, or application (e.g., the state of an application implemented by the stateful cluster). Segmenting the data across the stateful cluster may allow for different nodes in the cluster to maintain a different respective portion of the state that is different than at least one other storage node in the cluster (e.g., some redundancy schemes may have two copies of the same portion of data at different storage nodes). The data warehouse cluster described above in FIGS. 2-4B provides an example of a stateful cluster, in some embodiments.

In various embodiments, a scaling event may be detected for the stateful cluster, as indicated at 520. For example different alarms may be set that trigger a scaling event when a utilization or capacity threshold of the various nodes in the stateful cluster is exceeded (or fallen below). For instance, if CPU utilization across the storage nodes exceeds 75%, then a scaling event may be detected. Similarly, if CPU utilization falls below 40%, a scaling event may be triggered. In some embodiments, the amount of network traffic directed to the cluster may trigger a scaling event, or the amount of remaining storage at the storage nodes. In some embodiments, a client, application, or other entity that accesses the state in the stateful cluster may send a request to scale the cluster, triggering a scaling event. In at least some embodiments, a scaling event may be determined based, at least in part on CPU utilization, network bandwidth, and/or storage capacity among (or individually at) the nodes of the stateful cluster.

As indicated at 530, the stateful cluster may be adjusted to include a different number of storage nodes according to the scaling event. Thus, if the scaling event indicates that a certain number of storage nodes may be added to the stateful cluster, then stateful cluster may be adjusted to add the additional number of storage nodes. Similarly, in some embodiments, a decrease in the number of storage nodes may be indicated, resulting in a logical distribution of state among the decreased number of nodes. A control plane or other system component may add/remove the number of storage nodes.

Figure 6A:
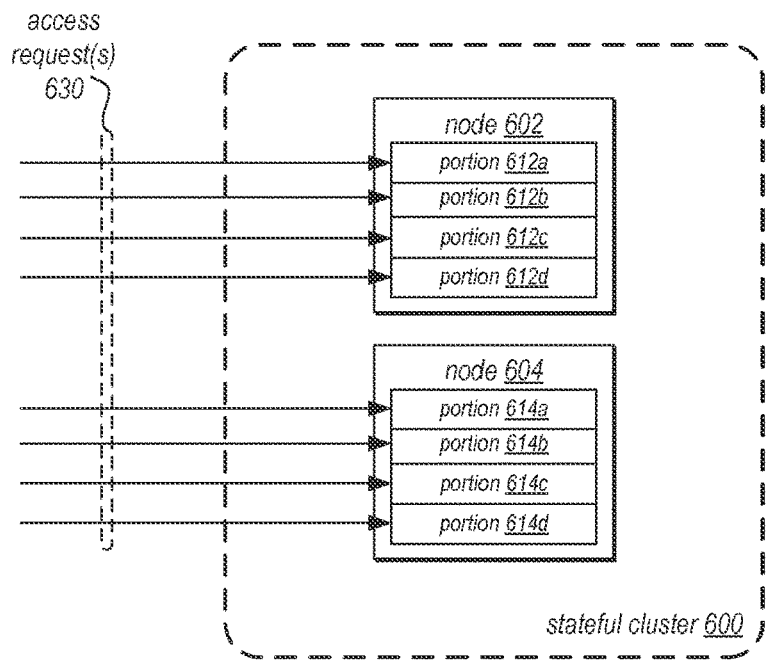
FIGS. 6A and 6B are logical illustrations of a stateful cluster and an adjusted stateful cluster processing access requests, according to some embodiments.
Figure 6B:
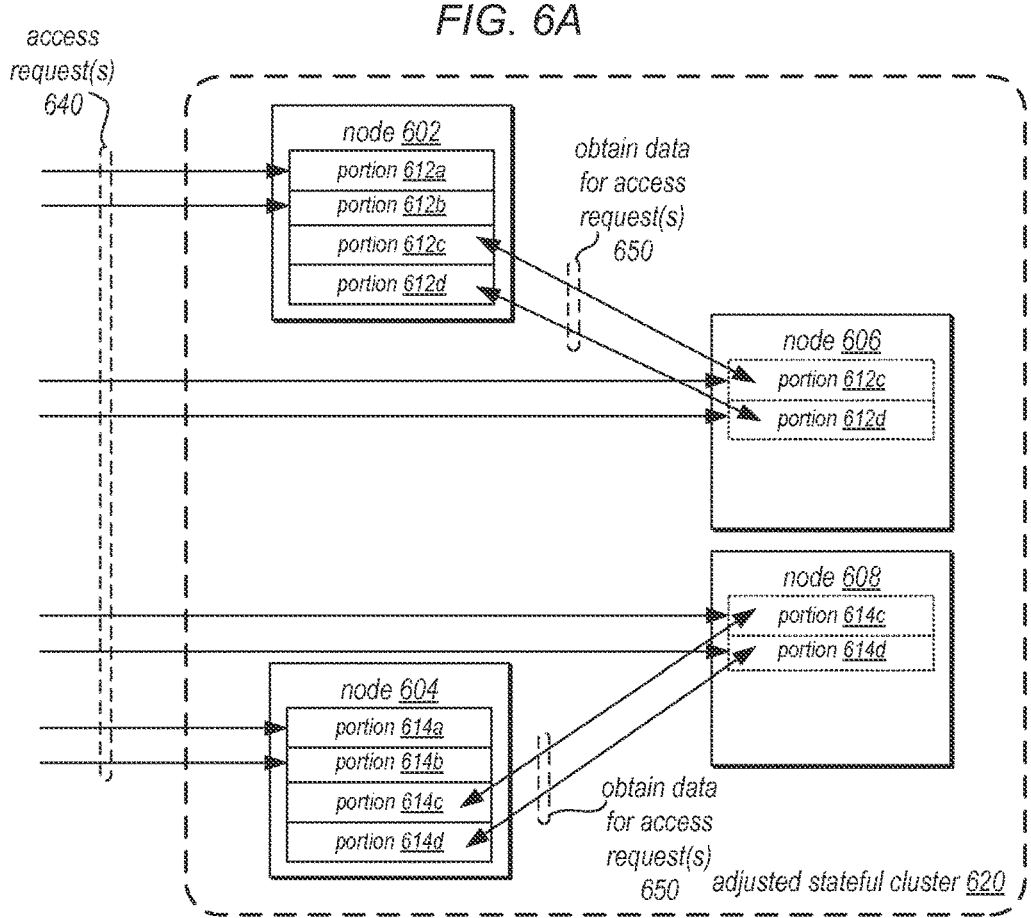

As indicated at 540, the state may be logically distributed across the different number of storage nodes included in the adjusted stateful cluster according to a monotone distribute scheme. Logically distributing the state may assign the responsibility for processing access requests for the different portions of the state according to the monotone distribution scheme. For example, FIG. 6A illustrates that a stateful cluster 600 processes access requests (e.g., access request(s) 630) for particular portions at a particular node. Node 602 processes access requests for portions 612a, 612b, 612c, and 612d. Similarly, node 604 processes access requests for portions 614a, 614b, 614c, and 614d. A logical distribution of the state is illustrated in FIG. 6B for an adjusted stateful cluster 620. Nodes 606 and 608 have been added to adjusted stateful cluster 620. The portions 612c and 612d from node 602 have been distributed to node 606 for processing access requests. Although the physical state information may still be maintained at node 602, node 606 may service access request(s) 640 for those portions. As illustrated at 650, node 606 may still obtain data from portions 612c and 612d from node 602. Node 602 may now only process access request(s) 640 for portions 612a and 612b. Similarly, node 608 processes access requests for portions 614c and 614d (so that node 604 may only process access request(s) for portions 614a and 614b).

The logical distribution of state may be performed according to a monotone distribution scheme. For example, various types of hash distribution schemes may be monotone (e.g., ranged monotone hash functions, minimal perfect hash functions, or consistent hash functions). A distribution scheme may be monotone if it preserves the lexicographical order of state as maintained in the storage nodes, in some embodiments.

As indicated at 550, the adjusted stateful cluster may be made available to process access requests for the state the different number of storage nodes (e.g., the storage nodes in the adjusted stateful cluster), such as illustrated and discussed above with regard to FIG. 6B. In some embodiments, access requests may be routed to storage nodes according to the monotone distribution scheme.

Figure 7:
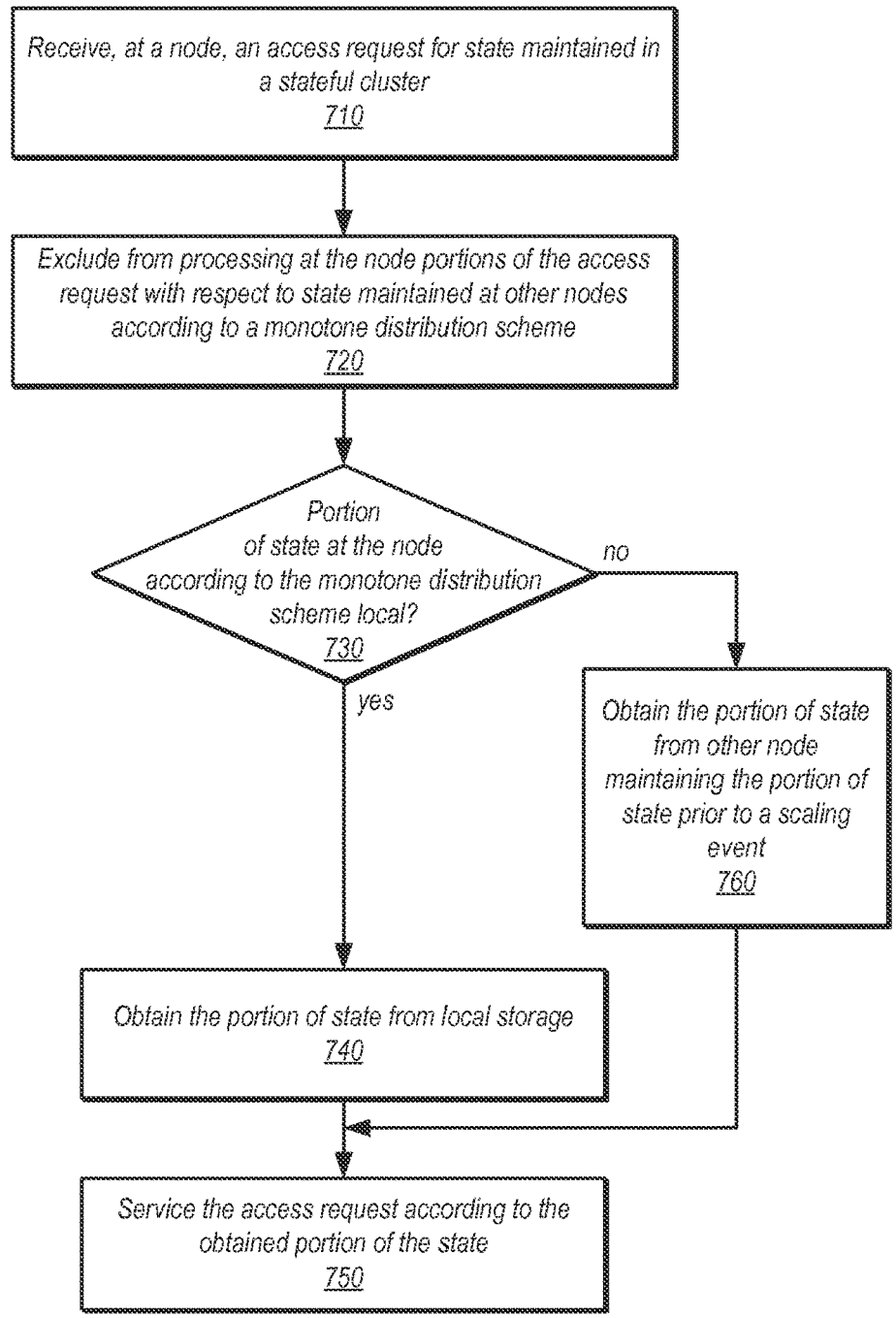
FIG. 7 is a high-level flowchart illustrating various methods and techniques for processing access requests at a node of a scaled stateful cluster, according to some embodiments.

While, in some embodiments a logical distribution of the state may only be performed for servicing access requests (e.g., to handle burst workloads), the state may also be physically distributed across the different number of storage nodes in the adjusted stateful cluster according to the monotone distribution scheme (e.g., block 560). As denoted by the dotted lines this may be performed prior to or waiting for another scaling event for the stateful cluster (which may, for example, shrink the cluster back to an original number of storage nodes). Physically distributing the state may include transferring or sending data from those nodes where it is currently maintained to the nodes where it will reside according to the monotone distribution scheme. In at least some embodiments, the physical distribution may be performed as a background process (while processing access requests may be a part of foreground processing). In some embodiments, access requests may be serviced according to the logical distribution of the state at the adjusted stateful cluster until completion of the physical distribution, after which access requests may be able to locate the respective portion of state according to the distribution scheme locally. FIG. 7 is a high-level flowchart illustrating various methods and techniques for processing access requests at a node of a scaled stateful cluster, according to some embodiments.

As indicated at 710, an access request may be received at a storage node for state 710. In some embodiments, the access request may be a part of a larger access request divided up amongst the storage nodes of a stateful cluster for parallel processing (or it may be a stand-alone access request or part of a smaller access request directed to multiple portions of state). The storage node may, in some embodiments, exclude from processing at the storage node portions or parts of the access request that apply to portions of state maintained at other storage nodes according to the monotone distribution scheme (e.g., block, 720). Node 602 in FIG. 6B, for example, may receive access requests 640 for portions 612c and 612d, but may drop the requests (or redirect them to node 606).

If only logical distribution of the state has occurred for a scaling event, then the portion of state may not be local, as illustrated by the negative exit from 730. Thus, as illustrated in block 760, the portion of the state may be obtained from another storage node that still maintains the state (even if not processing access requests for it). However, if the physical distribution of the state has occurred, then the portion of state may be local, as indicated by the positive exit from 730, and thus the portion of state may be locally obtained, as indicated at 740, prior to servicing the access request according to the obtained portion of state, as indicated at 750.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
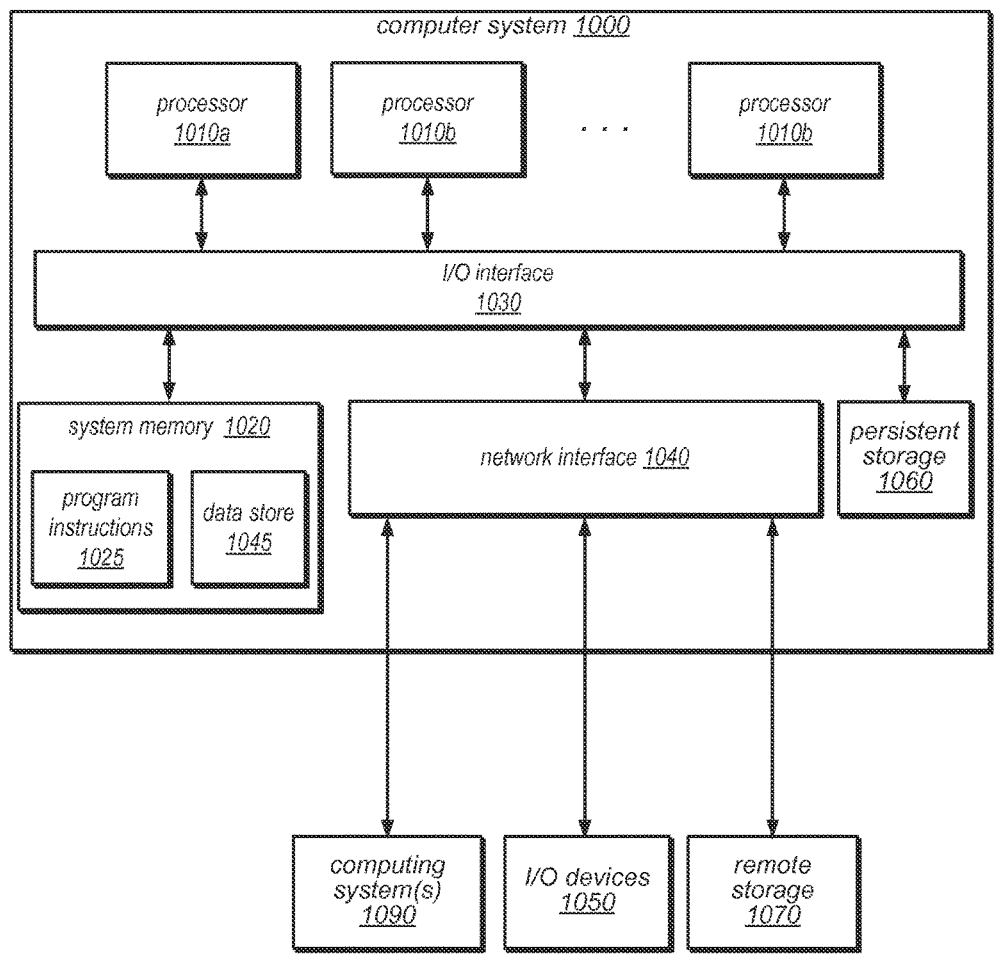
FIG. 8 is a block diagram illustrating a general computing system, according to various embodiments.

FIG. 8 is a block diagram illustrating a general computer system, according to various embodiments. For example, computer system 1000 may be configured to implement a leader node of a cluster in a distributed data warehouse system, a compute node or storage node of a cluster in a distributed data warehouse system, a distributed data warehouse front-end service module, or any other component of a distributed storage system and/or stateful cluster. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors (e.g., 1010, 1010a, 1010b) (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement a distributed system. In another example, an instance of a server application executing on computer system 1000 may use network interface 1040 to communicate with other instances of the server application that may be implemented on other computer systems.

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed.

Computer system 1000 includes one or more system memories 1020 that are configured to store instructions and data accessible by processor 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a leader node of a cluster in a distributed data warehouse system, a compute node or storage node of a cluster in a distributed data warehouse system, a distributed data warehouse front-end service module, or any other component of a distributed database system. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 130. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the data warehouse system (e.g., on a leader node or a compute node), such as a superblock data structure, one or more data block access counters, a query history, an transaction log, or other information used in performing the methods described herein may be stored in data store 1045 or in another portion of system memory 1020 on one or more nodes, in persistent storage 1060, and/or on one or more remote storage devices 1070, in various embodiments. In some embodiments, and at various times, system memory 1020 (e.g., data store 1045 within system memory 1020), persistent storage 1060, and/or remote storage 1070 may store primary copies of data blocks, secondary copies (i.e., replicas) of data blocks, backup copies of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1510). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more server nodes and/or clients of the distributed data warehouse system and/or a distributed database system), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A distributed storage system, comprising:
a first plurality of storage nodes implemented via respective processors and memory that together implement a storage cluster that stores data for a client, wherein the data is segmented across the plurality of storage nodes;
a control plane for the distributed storage system, implemented via one or more processors and memory to:
detect a scaling event for the storage cluster;
in response to the detection of the scaling event:
adjust the storage cluster to include an adjusted number of storage nodes that is different than the first plurality of storage nodes according to the scaling event;
provide an indication of the scaling event to a leader node for the storage cluster;

the leader node for the storage cluster, implemented via one or more processors and memory to:
  receive the indication of the scaling event;
  in response to the receipt of the scaling event,
    logically reassign responsibility for processing access requests for the data across the adjusted number of storage nodes in the adjusted storage cluster according to a monotone distribution scheme before the data is moved to the adjusted number of storage nodes;
at least one of the adjusted number of storage nodes in the adjusted storage cluster to physically redistribute the data, comprising:
  obtain, in response to receipt of an access request distributed according to the logically reassigned responsibility, a portion of data from at least one of the first plurality of storage nodes that maintains a segment of the data in order to process the access request; and
  store the obtained portion of the data;
the adjusted storage cluster to process access requests for the data at the number of storage nodes in the adjusted storage cluster according to the monotone distribution scheme, wherein prior to making the adjusted storage cluster available, the plurality of storage nodes are available to process other access requests for the data as segmented across the plurality of storage nodes.

2. The system of claim 1,
wherein the scaling event for the storage cluster indicates a size increase such that the number of storage nodes included in the adjusted storage cluster is greater than the first plurality of storage nodes;
wherein another scaling event is detected for the storage cluster at the control plane;
wherein the control plane is further configured to perform another adjustment of the storage cluster, and another provision of the indication of the other scaling event to the leader node in response to the detection of the other scaling event; and
wherein the leader node is further configured to perform another the logically reassign responsibility for processing access requests for the data, wherein the other scaling event indicates a size decrease such that the number of storage nodes included in the storage cluster in response to the other scaling event is less than the adjusted number of storage nodes.

3. The system of claim 1,
wherein the leader node is further configured to direct physical distribution of the data across the adjusted number of storage nodes in the adjusted storage cluster according to the monotone distribution scheme, in response to receipt of the indication of the scaling event, wherein upon completion of the physical distribution the at least one storage node of the adjusted number of storage nodes included in the adjusted storage cluster processes subsequent access requests based, at least in part, on a portion of data obtained from local storage.

4. The system of claim 1, wherein the distributed storage system is a network-based data warehouse, wherein the client is one of a plurality of clients of the network-based data warehouse, and wherein the storage cluster is one of a plurality of storage clusters.

5. A method, comprising:
performing, by a plurality of computing devices:
  maintaining state segmented across a stateful cluster that comprises a first plurality of nodes maintaining the state;
  detecting a scaling event for the stateful cluster;
  in response to detecting the scaling event:
    adjusting the stateful cluster to include a number of nodes that is different than the first plurality of nodes according to the scaling event;
    logically reassigning responsibility for the state across the number of nodes in the adjusted stateful cluster according to a monotone distribution scheme before moving the state to the number of nodes;
    physically redistributing, by at least one node of the adjusted stateful cluster, the state, comprising:
      obtaining, in response to receiving an access request distributed according to the logically reassigned responsibility, a portion of state from at least one of the first plurality of nodes according to a segmentation of the state across the first plurality of nodes as maintained prior to the scaling event in order to process access requests; and
      storing the obtained portion of the state; and
    processing access requests for the state at the number of nodes in the adjusted stateful cluster according to the monotone distribution scheme, wherein prior to making the adjusted stateful cluster available, the plurality of nodes are available to process other access requests for the state as segmented across the plurality of nodes.

6. The method of claim 5, wherein the scaling event for the stateful cluster indicates a size increase such that the number of nodes included in the adjusted stateful cluster is greater than the plurality of nodes.

7. The method of claim 6, wherein another scaling event is detected for the stateful cluster, and wherein the method further comprises:
  performing another adjusting of the stateful cluster, and another logically distributing the state, wherein the other scaling event indicates a size decrease such that the number of nodes included in the stateful cluster in response to the other scaling event is less than the number of nodes included in response to the scaling event.

8. The method of claim 5, wherein the method further comprises:
  in response to detecting the scaling event, physically distributing the state across the number of nodes in the adjusted stateful cluster according to the monotone distribution scheme, wherein upon completion of the physical distribution the at least one node of the number of nodes included in the adjusted stateful cluster processes subsequent access requests without obtaining a portion of state from a node in the plurality of nodes.

9. The method of claim 8, wherein physically distributing the state across the number of nodes is performed as part of background processing, and wherein processing the access requests at the number of nodes included in the adjusted stateful cluster is performed as part of foreground processing.

10. The method of claim 5, wherein detecting the scaling event for the stateful cluster comprises receiving a scaling request from a client via a network-based interface for the stateful cluster.

11. The method of claim 5, wherein detecting the scaling event for the stateful cluster is based, at least in part, on processing utilization, storage capacity, or networking bandwidth for the plurality of nodes.

12. The method of claim 5, further comprising:
receiving, at the at least one node of the number of nodes included in the adjusted stateful cluster, an access request for a select portion of the state;
in response to receiving the access request:
obtaining the select portion of the state from the at least one node of the plurality of nodes in the stateful cluster; and
servicing the access request at the at least one node of the number of nodes based, at least in part, on the obtained select portion.

13. The method of claim 5, wherein the stateful cluster is a distributed data store and wherein the state is data maintained for a client of the distributed data store.

14. A non-transitory, computer-readable storage medium, storing program instructions that when executed by one or more computing devices cause the one or more computing devices to implement:
maintaining data for a storage client that is segmented across a storage cluster that comprises a first plurality of storage nodes;
detecting a scaling event for the storage cluster; and
in response to detecting the scaling event:
adjusting the storage cluster to include a number of storage nodes that is different than the plurality of storage nodes according to the scaling event;
logically reassigning responsibility for the data across the number of storage nodes in the adjusted storage cluster according to a monotone distribution scheme before moving the data to the number of storage nodes;
physically redistributing the data, comprising:
obtaining, in response to receiving an access request distributed according to the logically reassigned responsibility, by at least one of the number of storage nodes in the adjusted storage cluster, a portion of data from at least one of the first plurality of storage nodes maintaining a segment of the data in order to process access requests; and
storing, by the at least one storage node, the portion of the data; and
processing access requests for the data at the number of storage nodes in the adjusted storage cluster according to the monotone distribution scheme, wherein prior to making the adjusted storage cluster available, the plurality of storage nodes are available to process other access requests for the data as segmented across the plurality of storage nodes.

15. The non-transitory, computer-readable storage medium of claim 14,
wherein the scaling event for the storage cluster indicates a size increase such that the number of storage nodes included in the adjusted storage cluster is greater than the first plurality of storage nodes;
wherein another scaling event is detected for the storage cluster; and
wherein the program instructions cause the one or more computing devices to further implement performing another adjusting of the storage cluster, another logically distributing of the data, and wherein the other scaling event indicates a size decrease such that the number of storage nodes included in the adjusted storage cluster in response to the other scaling event is less than the number of storage nodes included in response to the scaling event.

16. The non-transitory, computer-readable storage medium of claim 14, wherein the program instructions cause the one or more computing devices to further implement:
in response to detecting the scaling event, physically distributing the data across the number of storage nodes in the adjusted storage cluster according to the monotone distribution scheme, wherein upon completion of the physical distribution the at least one storage node of the number of storage nodes included in the adjusted storage cluster processes subsequent access requests without obtaining a portion of data from a storage node in the plurality of storage nodes.

17. The non-transitory, computer-readable storage medium of claim 16, wherein the program instructions cause the one or more computing devices to further implement:
upon completion of the physical distribution of the data across the number of storage nodes in the adjusted storage cluster:
receiving at a storage node of the number of storage nodes included in the adjusted storage cluster, an access request for a select portion of the data;
in response to receiving the access request:
obtaining the select portion of the state from storage local to the storage node; and
servicing the access request at the storage node based, at least in part, on the obtained select portion.

18. The non-transitory, computer-readable storage medium of claim 14, wherein the scaling event for the storage cluster indicates a size decrease such that the number of storage nodes included in the adjusted storage cluster is less than the plurality of storage nodes.

19. The non-transitory, computer-readable storage medium of claim 14, wherein, in detecting the scaling event for the storage cluster, the program instructions cause the one or more computing devices to implement receiving a scaling request from the client via a network-based interface for the storage cluster.

20. The non-transitory, computer-readable storage medium of claim 14, wherein the storage cluster is implemented as part of a network-based storage service, and wherein the client is one of a plurality of clients of the network-based storage service.

* * * * *